US010270689B2

(12) United States Patent
Azgin et al.

(10) Patent No.: US 10,270,689 B2
(45) Date of Patent: Apr. 23, 2019

(54) MULTI-NONCE ENABLED INTEREST PACKET DESIGN FOR NAMED-DATA NETWORKING

(71) Applicant: Futurewei Technologies Inc., Plano, TX (US)

(72) Inventors: Aytac Azgin, Santa Clara, CA (US); Ravishankar Ravindran, San Ramon, CA (US); Guo-Qiang Wang, Santa Clara, CA (US)

(73) Assignee: FutureWei Technologies, Inc., Plano, TX (US)

( * ) Notice: Subject to any disclaimer, the term of this patent is extended or adjusted under 35 U.S.C. 154(b) by 272 days.

(21) Appl. No.: 14/578,061

(22) Filed: Dec. 19, 2014

(65) Prior Publication Data

US 2016/0182368 A1    Jun. 23, 2016

(51) Int. Cl.
*H04W 48/16* (2009.01)
*H04L 12/741* (2013.01)
*H04W 36/12* (2009.01)
*H04L 12/775* (2013.01)
*H04W 36/22* (2009.01)
*H04L 12/725* (2013.01)

(52) U.S. Cl.
CPC ............ *H04L 45/74* (2013.01); *H04L 45/306* (2013.01); *H04L 45/58* (2013.01); *H04W 36/12* (2013.01); *H04W 36/22* (2013.01); *H04W 48/16* (2013.01)

(58) Field of Classification Search
CPC ....... H04L 45/74; H04L 45/306; H04L 45/58; H04W 36/22; H04W 48/16; H04W 36/12
See application file for complete search history.

(56) References Cited

U.S. PATENT DOCUMENTS

| 6,061,789 A * | 5/2000 | Hauser ................. G06F 21/606 380/255 |
| 9,553,812 B2 * | 1/2017 | Mahadevan ........ H04L 47/2466 |
| 2010/0195655 A1 * | 8/2010 | Jacobson .............. H04L 45/748 370/392 |
| 2013/0060962 A1 * | 3/2013 | Wang .................... H04L 67/327 709/238 |

(Continued)

OTHER PUBLICATIONS

Huan Yan, "HR: Hedging Redundancy of Data in Content Centric Network", IEEE, published in 2013, pp. 388-393.*

(Continued)

*Primary Examiner* — Lan-Huong Truong
(74) *Attorney, Agent, or Firm* — FutureWei Technologies, Inc.

(57) ABSTRACT

A router, and a method of routing an interest packet having multiple nonces in NDN to eliminate stale PIT entries. The method includes a consumer device initially sending an interest packet having a first nonce within a protocol data unit (PDU), the interest packet having a second nonce. A router receives the interest packet and creates a pending interest table (PIT) entry. The consumer device resends the interest packet, the router keeping a single PIT entry per consumer device and using the second nonce to clear PIT entries corresponding to the initial transmission of the consumer device. The first nonce is indicative of requested content from the producer device, and the second nonce is indicative of the consumer device.

19 Claims, 6 Drawing Sheets

(56) References Cited

U.S. PATENT DOCUMENTS

| | | | | |
|---|---|---|---|---|
| 2013/0282920 | A1* | 10/2013 | Zhang | H04L 45/74 709/238 |
| 2014/0237085 | A1* | 8/2014 | Park | G06Q 50/10 709/219 |
| 2014/0280823 | A1* | 9/2014 | Varvello | H04L 67/327 709/223 |
| 2014/0351929 | A1* | 11/2014 | Mahadevan | H04L 63/1408 726/22 |
| 2015/0113166 | A1* | 4/2015 | Mosko | H04L 45/14 709/242 |
| 2015/0117452 | A1* | 4/2015 | Mosko | H04L 47/365 370/392 |
| 2016/0119194 | A1* | 4/2016 | Valencia Lopez | H04L 41/50 709/223 |
| 2016/0173386 | A1* | 6/2016 | Garcia-Luna-Aceves | H04L 47/17 709/238 |
| 2016/0182680 | A1* | 6/2016 | Stapp | H04L 67/2842 709/217 |

OTHER PUBLICATIONS

Huichen Dai, "On Pending Interest Table in Named Data Networking", IEEE, published in 2012 ACM/IEEE Symposium on Architecture for Network and communications systems (ANCS), year 2012, pp. 211-222.*

Huan Yan, IEEE "Hedging Redundancy of Data in Content Centric Network", 2013 22nd Wireless and Optical Communication Conference; Year: 2013, pp. 388-393.*

Matteo Varvello, IEEE "On the design and implementation of a wire-speed pending interest table", 2013 IEEE Conference on Computer Communications Workshops (INFOCOM WKSHPS); Year: 2013, pp. 369-374.*

Huichen Dai, IEEE "On Pending Interest Table in Named Data Networking", 012 ACM/IEEE Symposium on Architectures for Networking and Communications Systems (ANCS), Year: 2012,pp. 211-222, IEEE Conference Publications.*

Huan Yan, IEEE "Hedging Redundancy of Data in Content Centric Network", 2013 22nd Wireless and Optical Communication Conference; Year: 2013, pp. 388-393. (Year: 2013).*

* cited by examiner

MULTI-NONCE ENABLED INTEREST PACKET DESIGN FOR NAMED-DATA NETWORKING

TECHNICAL FIELD

The present disclosure relates generally to mobile content delivery in Named Data Networking (NDN) with location centric forwarding, and more specifically to addressing stale PIT entries that can prevent the network from using resource optimal paths.

BACKGROUND

Stale PIT entries in NDN with location centric forwarding can prevent the network from using resource optimal paths, introducing additional overhead.

In NDN, each Interest packet carries a nonce value to identify duplicate Interests. Retransmitted Interests carry a different nonce value allowing the routers to try different outgoing interfaces for the retransmissions. If the hosts are mobile, because of mobile handovers, retransmissions are regularly observed. Such retransmissions follow different paths per design. This is the case, even if the major portion of the path to content source is not changed, forcing the network to send the retransmissions over non-optimal paths.

If PIT entries can be cleared, before updating the PIT with the information contained within the retransmitted Interest, resource-optimal paths can continue to be used.

SUMMARY

The present disclosure provides a multi-nonce enabled interest packet for NDN.

According to a first embodiment of the disclosure, a method of routing an interest packet in NDN comprises a consumer device initially sending an interest packet having a first nonce within a protocol data unit (PDU), the interest packet having a second nonce. A router receives the interest packet and creates a pending interest table (PIT) entry. The consumer device resends the interest packet, the router keeping a single PIT entry (or nonce value within the entry) per content name per consumer device and using the second nonce to clear PIT entries corresponding to the initial transmission of the consumer device.

In some embodiments, the first nonce is indicative of requested content from the producer device, and the second nonce is indicative of the consumer device. The router may determine that the producer device is not available to the router before receiving the retransmission of the interest packet. The router keeps the single PIT entry (or nonce value within the entry) per content name per consumer device if a mobile service tag (MS-tag) is set in the PDU. The second nonce is used to identify a single incoming interface for the interest packet from the consumer device, over which to deliver a data packet, improving NDN resource usage efficiency.

In some embodiments, the second nonce is dynamically varied such that an identity of the consumer device is anonymous to the producer device or any other device receiving the interest packet. The MS-tag is used to identify data flows supported, and a mobility update flag (MU-tag) is used to alert the consumer device of a location change of the producer device. The consumer device discovers the location of the producer device in response to receiving the MU-tag after handover of the producer device. The second nonce is used as a host identifier and provides mapping between hosts/incoming/outgoing interfaces. The initial transmission generates a first path according to forwarding labels, and the retransmission also uses the first path.

In another embodiment, a router is operable in NDN. The router is configured to receive from a consumer device an interest packet having a first nonce within a protocol data unit (PDU), the interest packet having a second nonce. The router is configured to create a pending interest table (PIT) entry based on the interest packet. The router is configured to receive a retransmission of the interest packet, and keep a single PIT entry per consumer device and use the second nonce to clear PIT entries corresponding to the initial transmission of the consumer device.

In some embodiments, the first nonce is indicative of requested content from the producer device, and the second nonce is indicative of the consumer device. The router is configured to determine that the producer device is not available to the router before receiving a retransmission of the interest packet. The router is further configured to keep a single PIT entry per content name per consumer device if a mobile service tag (MS-tag) is set in the PDU. The router is further configured to use the second nonce to identify a single incoming interface for the interest packet from the consumer device, over which to deliver a data packet.

In some embodiments, the router is further configured to process a dynamically varied said second nonce such that an identity of the consumer device is anonymous to the producer device. The router is configured to identify data flows supported when the MS-tag is used, and a mobility update flag (MU-tag) is used to alert the consumer device of a location change of the producer device. The router is configured to enable the consumer device to discover location of the producer device in response to receiving the MU-tag after handover of the producer device. The second nonce is configured as a host identifier and provide mapping between hosts/incoming/outgoing interfaces. The router is further configured to be part of a first path according to forwarding labels, and also part of the first path during retransmission of the interest packet.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

This disclosure introduces and/or involves the following network components:

Named Entities: Could be Services/Devices/Content/Users.

Domain Controller: A local domain controller for name resolution and the fast-path table (FPT). The domain controllers also participate in distributed policy based exchange of Entity-id and Network binding. E.g. BGP can be used for this purpose.

Forwarding-Label: To leverage complete decoupling of entity-id and resolution point, the forwarding-label is temporary based on policy requirement, hence, could be of Nodal/Domain/Global scope.

Fast-Path Table: To avoid slow-path resolution, the FPT table allows nodal fast switching, and only the first interest packet of the flow requires resolution. Re-resolution may be required if the resource object is mobile or the service is scaled or migrated.

Entity-ID: The meaning of this remains unchanged from what ICN identifies, and any generic format such as PID can also be used. But this has implication on the content routing implementation as such, this disclosure is unaffected by this.

Mobility Service: Entities register to the network for mobility service, this creates a name:home-network binding. In addition the ICN layer actively marks the content response by setting the mobility update flag, which forces re-resolution of the named entities. In addition, the Interest can also have the mobility service flag set for the network to handle the Interest through the FTP and local control resolution.

One solution to handle mobility, including NDN inter/intra-domain mobility, is disclosed in commonly assigned U.S. patent application Ser. No. 14/146,540 entitled Method and Apparatus for Scalable Content Routing and Mobility in Named Data Networks, filed Jan. 2, 2014, the teachings of which are included herein by reference in their entirety.

Figure 8:
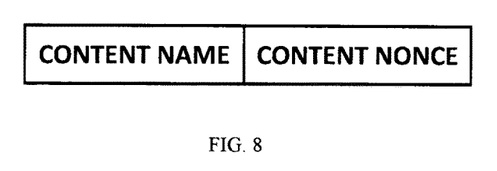
FIG. 8 illustrates a protocol data unit (PDU) format.
Figure 9:
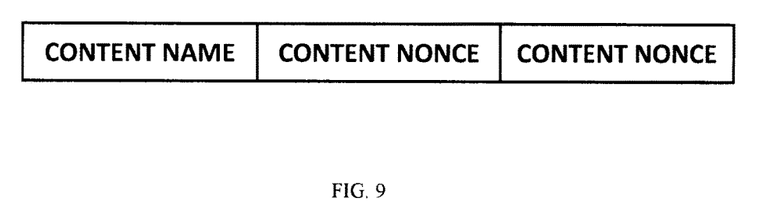
FIG. 9 illustrates a changed protocol data unit (PDU) format.

The present disclosure changes the protocol data unit (PDU) format for an NDN current Interest packet structure from what is illustrated by FIG. 8 to what is illustrated by FIG. 9.

The Content Nonce (first nonce) is used to identify duplicate transmissions, thereby preventing the formation of loops.

The change is to add a Context Nonce (second nonce) to identify transmissions from different hosts/sessions, to support resource-efficient location-centric forwarding for mobile content delivery. In location-centric forwarding, Interest packets are forwarded towards the Producer device (content source) using forwarding labels, which represent the next-hop information (designated router along the path, Border/Edge Router or Service Routers). According to this disclosure, the Consumer device (content requester) has access to a Producer device location with some delay, which causes the perceived retransmissions. Hence, flooding is not typically used. Any incoming Interest packet should be forwarded along the cost optimal path to the Producer device.

However, the pending interest table (PIT) operation in NDN requires different faces to be used for existing entries, when needed, for instance, during retransmission attempts. With location-centric forwarding, for the delivery of mobile content, a mechanism is needed to bypass that PIT operation, by also following the operation guidelines of NDN. The forwarding architecture and method of this disclosure utilizes the mobility-service tag (MS-tag) to enable such feature. By letting the routers keep a single PIT entry per content name per Consumer (if a mobile service tag is set), the user-identifier second nonce is used to clear PIT entries corresponding to earlier transmission attempts corresponding to that user. In doing so, the retransmissions are continued to be delivered over the path originally suggested by the forwarding labels. Furthermore, unlike the case where a simple retransmission flag is used, the second nonce value is used to identify a single incoming face for an Interest packet for a given consumer device, over which to deliver the Data packet, further improving the resource usage efficiency in the network.

Advantageously, the use of additional nonce values as host identifiers and related architectural changes provides the proper mapping between hosts/incoming/outgoing interfaces. This solution increases resource efficiency in the network, by reducing the number of retransmissions and utilizing cost-optimal paths, and increases robustness of the network to mobile content delivery. The second nonce can be dynamically varied, addressing the privacy concerns of NDN by allowing the host to be anonymous. The second nonce is also general enough to be used in different contexts, such as cache optimization, as it allows the routers to collect basic statistics on end host request patterns, which is typically hidden to content providers.

Figure 1:
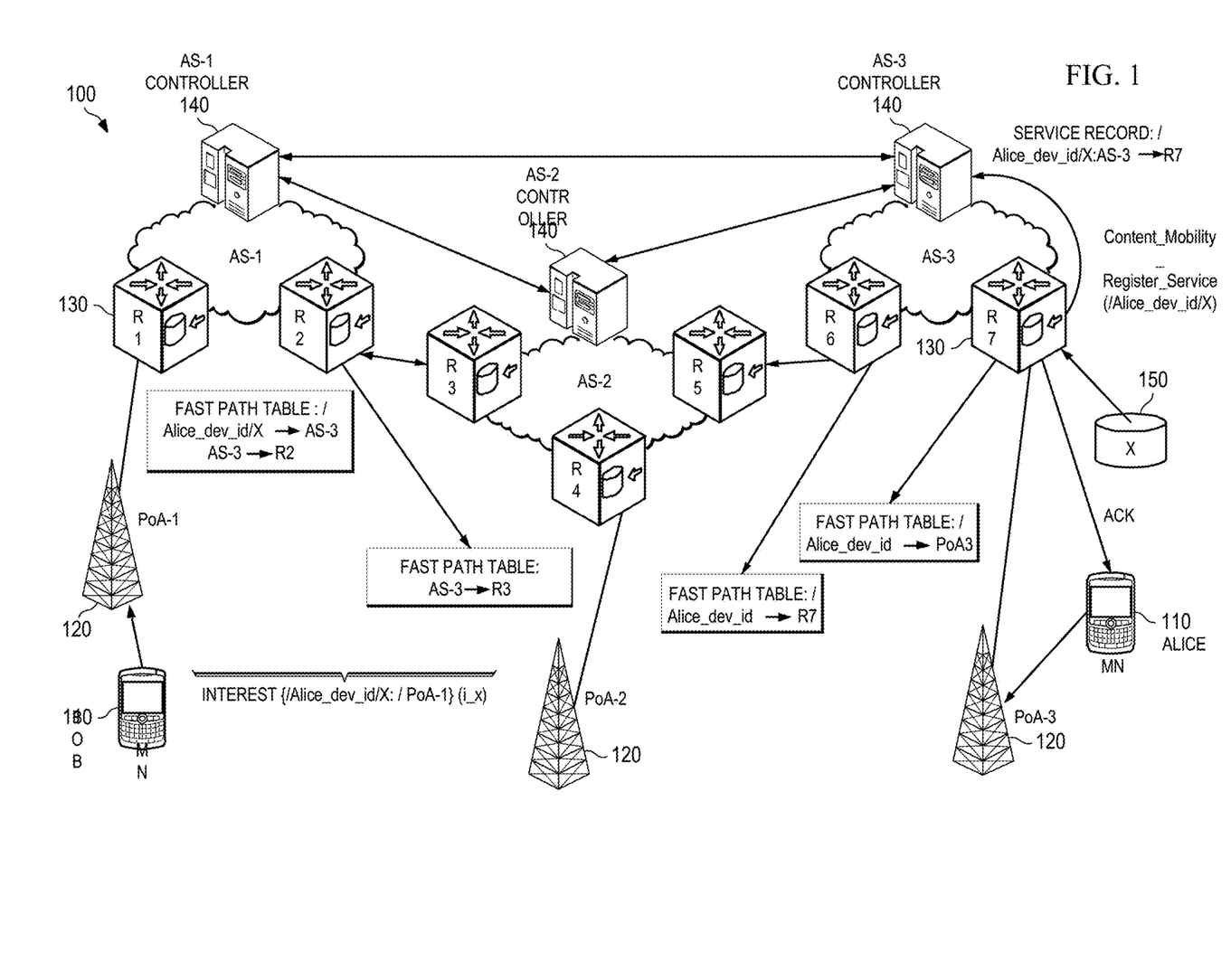
FIG. 1 illustrates a NDN network that supports a PDU format including a second nonce in an interest packet according to this disclosure.

FIG. 1 illustrates a NDN network at 100 that supports the PDU format including a second nonce in an interest packet according to the present disclosure. The system 100 may comprise a plurality of mobile nodes (MN) 110 serviced by a plurality of point of attachments (PoA) 120 providing network access to the mobile nodes 110, a plurality of content routers (R) 130, also referred to as edge routers (ER), a plurality of interconnected domain controllers (AS) 140, a plurality of service routers (SR) 150, and Fast Path Tables (FPT). In system 100, each entity (e.g. content portion, chunk, mobile entity, or networking element) may be uniquely identified by an identifier. Each MN 110 may be consumer or producer of content as discussed in this disclosure.

Figure 2:
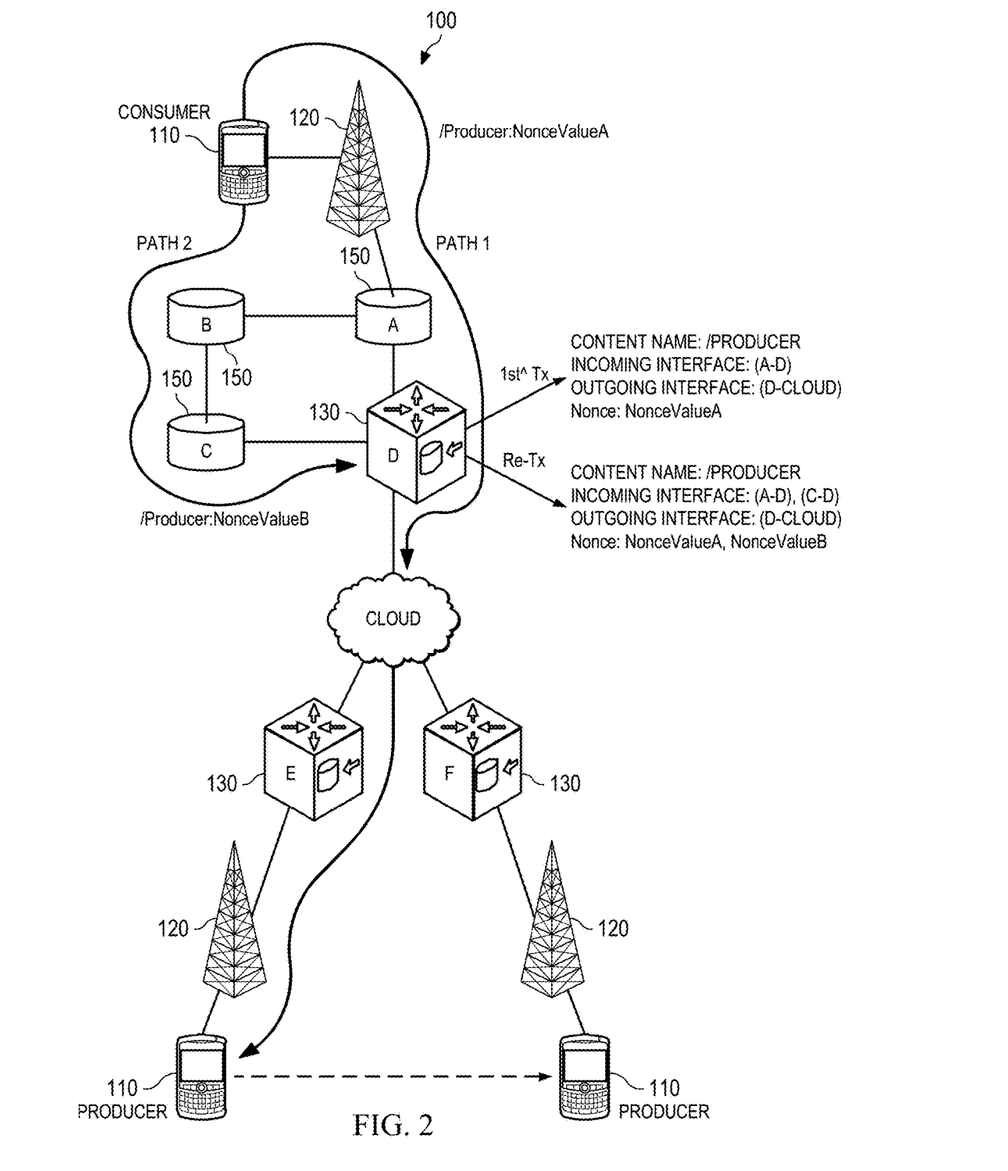
FIG. 2 illustrates operation where only a first content nonce is used.

To illustrate the increased interest overhead and increased latency in current NDN operation, FIG. 2 illustrates operation where only a first content nonce is used, as follows:

Interest packets are initially sent by Consumer device 110 over Path 1 as shown.

The Producer device 110 changes location, moving from router E to router F.

There is a failed delivery for Interest packets along Path 1 due to the Producer device changing location and routers.

The Consumer device 110 retransmits the Interest packets, this time, with a different nonce value.

Retransmissions of the Interest packets are forwarded along Path 2 through different service routers 150.

Router D still has the PIT entry for the earlier request, so Router D updates its PIT once it receives the retransmitted Interest packet.

Since Router D does not have an available interface to send the Interest packet (nodes cannot forward an Interest packet over interfaces on which it received the Interest packet, or over an interface it already used for the active request), it doesn't do anything, and waits until the current entries time out.

Assume Router D has another interface which it can use to forward the retransmitted Interest packet.

After Router D receives the Data packet (depending on the timeouts), Router D may need to send the Data packet over multiple interfaces: A-D and C-D.

Figure 3:
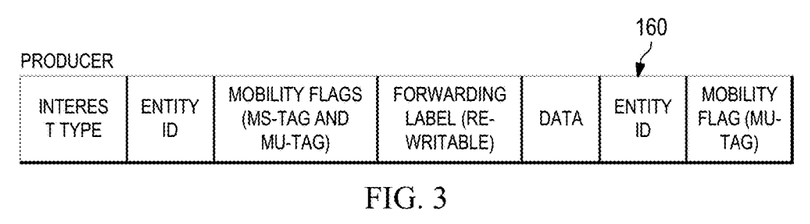
FIG. 3 illustrates a PDU format for an Interest packet and a Data.

Referring to FIG. 3, this disclosure updates the PDU format 160 for the Interest packet and the Data packet. The mobility service flag (MS-tag) is used to identify data flows supported for the fast forwarding service, and the mobility update flag (MU-tag) is used to alert the consumer side of a Producer location change and force location discovery at the consumer side, after handover by the Producer.

Figure 4:
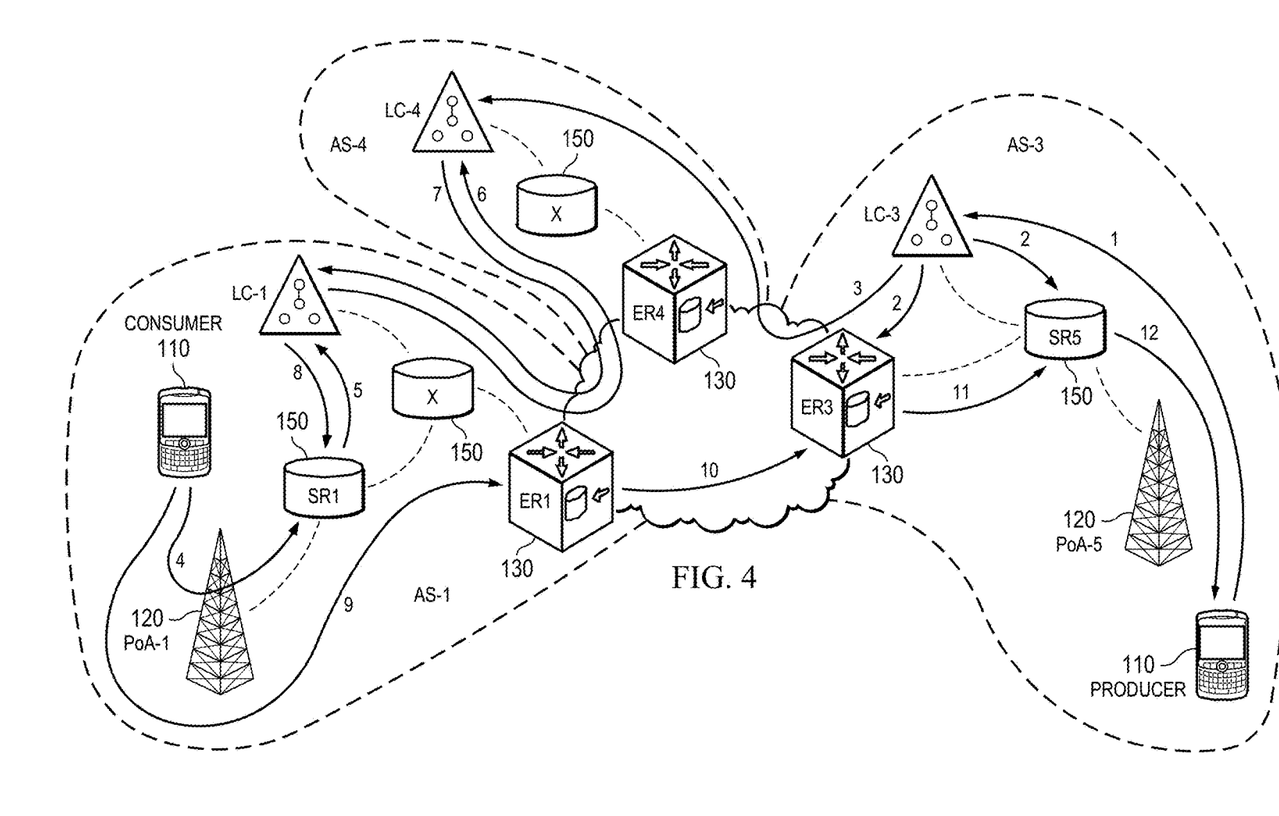
FIG. 4 illustrates a location centric forwarding architecture.

FIG. 4 illustrates a location centric forwarding architecture, where the following steps are performed:

1. The Producer device 110 sends a Registration message to a local controller (LC) 3 with the MS-tag set.

2. The local controller LC3 requests edge router ER3 and service router SR5 to update their FPT (SR5→PoA5, ER3→SR5).

3. The local controller LC3 updates local controller LC4 (Home Controller for Producer) with the Producer device's 110 current location (domain controller AS3).

4. The Consumer device 110 sends an Interest packet targeting Producer device 110.

5. The service router SR1 does not have name-location mapping for Producer device 110, so it contacts local controller LC1.

6. The local controller LC1 contacts local controller LC4 to learn the Producer device's location.

7. The local controller LC4 updates local controller LC1 with the Producer device's location.

8. The local controller LC1 informs service router SRI with the Producer device's location.

9. The service router SR1 forwards the Consumer's Interest packet to edge router ER1 (which is the exit point to reach AS3).

10. The edge router ER1 forwards the Interest packet towards domain controller AS3, going through first edge router ER2, then edge router ER3.

11. The edge router ER3 sees the destination network is AS3, ER3's current domain and checks its FPT to determine the service router, SR5 and forwards Interest packet to service router SR5.

12. The service router SR5 checks its FPT to identify the Producer device 110 is connected to PoA5 and sends the Interest packet to the Producer device 110 over PoA5.

Figure 5:
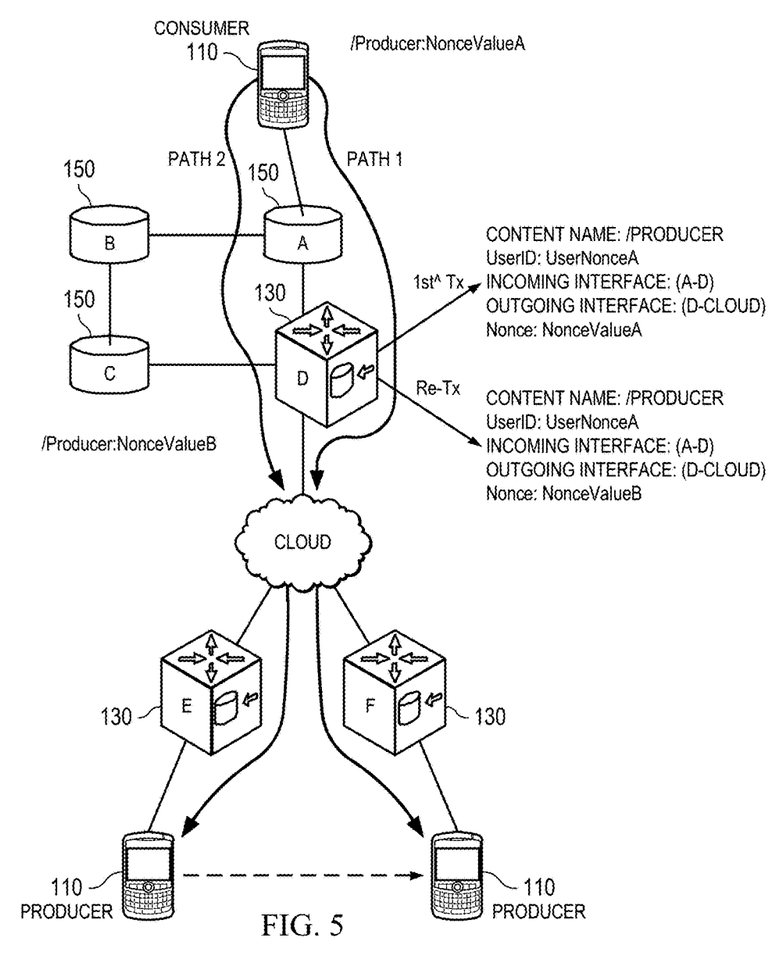
FIG. 5 illustrates a method of using a second nonce value as a context nonce.

Referring now to FIG. 5, there is shown one embodiment of the present disclosure using a second nonce value as a context nonce to clear PIT entries corresponding to earlier transmission attempts corresponding to a consumer device 110. In doing so, the retransmissions of the consumer device 110 are delivered over the path originally suggested by the forwarding labels using the FPTs. Other methods are possible using the Interest packet including the second nonce and are within the scope of this disclosure.

The Interest packets are initially sent over Path 1 through service router A and edge router D as shown.

The Producer device 110 changes location before delivery of the Interest packet, moving from edge router E to edge router F.

The delivery of the Interest packets along Path 1 fails due to the Producer device 110 changing edge routers.

The Consumer device 110 retransmits the Interest packets, this time, with a different second nonce value.

Retransmissions of the Interest packets are continued to be forwarded along Path 1 (which shares a common path with Path 2).

Router D still has the PIT entry from the earlier requests, so Router D updates its PIT once it receives the retransmitted Interest packets.

Router D uses the second nonce value to clear the existing PIT entry corresponding to the given Interest packet, and forwards the retransmission over the (D-Cloud) interface.

The Interest packet is forwarded along Path 2 until it reaches the Producer device's current location.

This disclosure solves the stale PIT entry problem by identifying retransmissions by comparing at a router a second (context) nonce entry within the newly received Interest packet to the existing PIT entries. This approach helps with location-centric forwarding since existing cost-optimal paths through routers can continue to be used for the retransmitted Interest packets, and no additional search is needed to find a valid path to the Producer, thus reducing recovery latency. This addresses NDN privacy objectives since context-nonce values are dynamically varied at a longer time scale, e.g., 10 seconds or more and Consumers (hosts sending Interest packets) cannot be identified. This is a robust solution that addresses the stale PIT entry problem in NDN that also allows a network to make use of user-based statistics to address other existing problems, such as caching. The context nonce values can be inserted at the application layer, or the CCN layer in the case of an active mobility service.

In addition, the present disclosure differentiates between retransmissions and transmissions from different users. Content popularity can be assessed, such as in the number of unique users requesting for the same content/file. The additional nonce values can also be used to identify malicious users. The user-identifier nonce can be multiplexed with user and context-dependent metadata, e.g. location and social information, within Interest packets to further interest processing.

Figure 6:
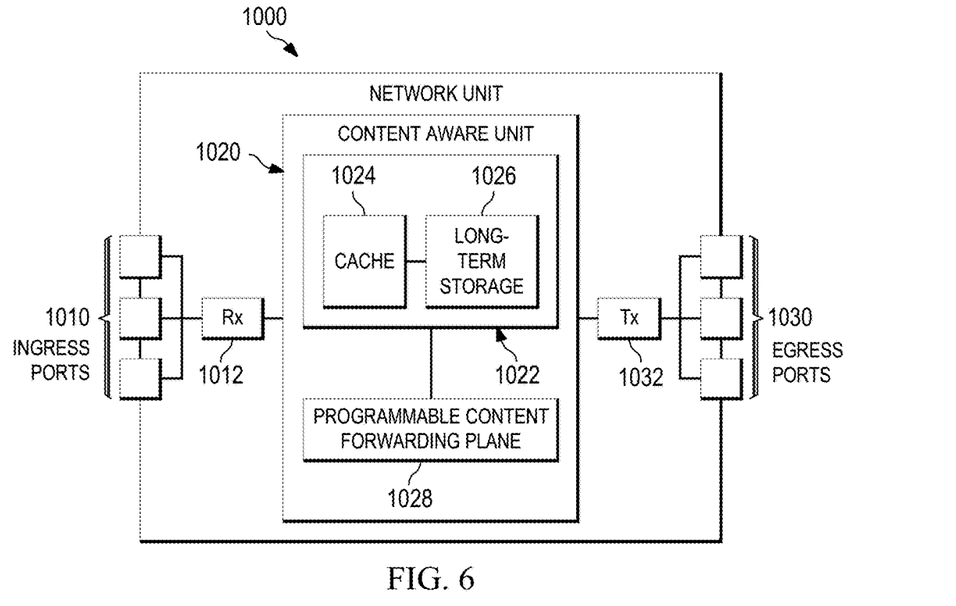
FIG. 6 illustrates a diagram of a network unit which may be any device that transports and processes data through the network.

FIG. 6 illustrates an embodiment of a network unit 1000, which may be any device that transports and processes data through network 100, including the Interest packet and the Data packet including the PDU according to the present disclosure. For instance, the network unit 1000 may correspond to or may be located in any of the system nodes described above, such as a MN, PoA, content router R/edge router ER, local controller LC, and AS. The network unit 1000 may also be configured to implement or support the schemes and methods described above. The network unit 1000 may comprise one or more ingress ports or units 1010 coupled to a receiver (Rx) 1012 for receiving signals and frames/data from other network components. The network unit 1000 may comprise a content aware unit 1020 to determine which network components to send content to. The content aware unit 1020 may be implemented using hardware, software, or both. The network unit 1000 may also comprise one or more egress ports or units 1030 coupled to a transmitter (Tx) 1032 for transmitting signals and frames/data to the other network components. The receiver 1012, content aware unit 1020, and transmitter 1032 may also be configured to implement at least some of the disclosed schemes and methods above, which may be based on hardware, software, or both. The components of the network unit 1000 may be arranged as shown in FIG. 6.

The content aware unit 1020 may also comprise a programmable content forwarding plane block 1028 and one or more storage blocks 1022 that may be coupled to the programmable content forwarding plane block 1028. The programmable content forwarding plane block 1028 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, and FIB) at the content aware unit 1020 or the network unit 1000. The programmable content forwarding plane block 1028 may interpret user requests for content and accordingly fetch content, e.g., based on meta-data and/or content name (prefix), from the network or other content routers and may store the content, e.g., temporarily, in the storage blocks 1022. The programmable content forwarding plane block 1028 may then forward the cached content to the user. The programmable content forwarding plane block 1028 may be implemented using software, hardware, or both and may operate above the IP layer or L2.

The storage blocks 1022 may comprise a cache 1024 for temporarily storing content, such as content that is requested by a subscriber. Additionally, the storage blocks 1022 may comprise a long-term storage 1026 for storing content relatively longer, such as content submitted by a publisher. For instance, the cache 1024 and the long-term storage 1026 may include Dynamic random-access memories (DRAMs), solid-state drives (SSDs), hard disks, or combinations thereof.

Figure 7:
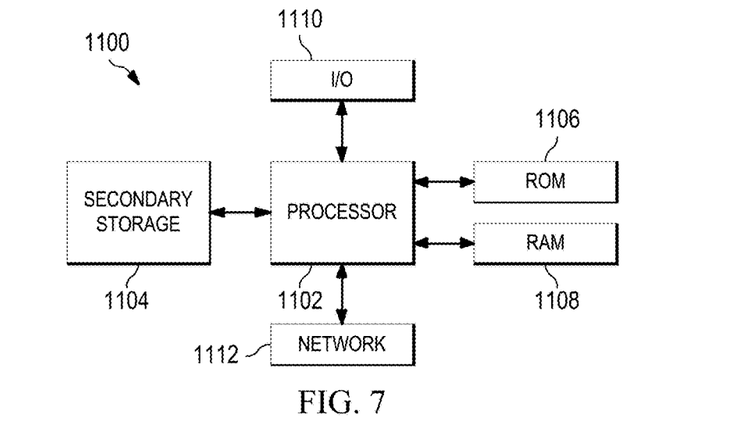
FIG. 7 illustrates a diagram of network components.

The network components described above may be implemented on any general-purpose network component, such as a computer or network component with sufficient processing power, memory resources, and network throughput capability to handle the necessary workload placed upon it. FIG. 7 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method implemented by a router for routing an interest packet in named-data networking (NDN), the comprising:
receiving from a consumer device an interest packet comprising a first nonce and a second nonce, wherein the second nonce of the interest packet indicates that the interest packet is associated with a first transmission of content requested by the consumer;
creating a pending interest table (PIT) entry based on the interest packet, wherein the PIT entry comprises the second nonce of the interest packet;
forwarding the interest packet to a producer device along a first path;
after forwarding the interest packet to the producer:
receiving from the consumer device a retransmission of the interest packet, wherein the retransmitted interest packet comprises a different second nonce, wherein the second nonce of the retransmitted interest packet indicates that the retransmitted interest packet is associated with a second transmission of the content requested by the consumer, and wherein the interest packet and the retransmitted interest packet request the same content;
clearing the PIT entry based on a determination that the second nonce of the retransmitted interest packet is different from the second nonce in the PIT.

2. The method of claim 1 wherein the first nonce is indicative of requested content from the producer device, and the second nonce is indicative of the consumer device.

3. The method of claim 1, further comprising:
determining that the producer device is not available to the router before receiving the retransmission of the interest packet; and
alerting the consumer device of a location change of the producer device.

4. The method of claim 3 wherein a mobility update flag (MU-tag) is used to alert the consumer device of a location change of the producer device.

5. The method of claim 4 wherein alerting the consumer device comprises sending a PDU message with the mobility update flag (MU-tag) to the consumer device.

6. The method of claim 1, further comprising:
receiving a registration message from a producer wherein the registration message has a MS-tag flag and, based thereon, maintaining a single PIT entry per content name per consumer device.

7. The method of claim 1 wherein the second nonce is used to identify a single incoming interface for the interest packet, over which to deliver a data packet.

8. The method of claim 1 wherein the second nonce is dynamically varied such that an identity of the consumer device is anonymous to the producer device.

9. The method of claim 1, further comprising forwarding the retransmitted interest packet to the producer along the first path.

10. A router for routing an interest packet in a named data networking (NDN), the router comprising:
memory storage comprising instructions; and
one or more processors in communication with the memory, wherein the one or more processors execute the instructions to:
receive from a consumer device an interest packet comprising a first nonce and a second nonce, wherein the second nonce of the interest packet indicates that the interest packet is associated with a first transmission of content requested by the consumer;
create a pending interest table (PIT) entry based on the interest packet, wherein the PIT entry comprises the second nonce of the interest packet;

forward the interest packet to a producer device along a first path;

after forwarding the interest packet to the producer:
receive from the consumer device a retransmission of the interest packet, wherein the retransmitted interest packet comprises a different second nonce wherein the second nonce of the retransmitted interest packet indicates that the retransmitted interest packet is associated with a second transmission of the content requested by the consumer, and wherein the interest packet and the retransmitted interest packet request the same content;

clear the PIT entry based on a determination that the second nonce of the retransmitted interest packet is different from the second nonce in the PIT.

11. The router of claim 10 wherein the first nonce is indicative of requested content from the producer device, and the second nonce is indicative of the consumer device.

12. The router of claim 10 wherein the one or more processors execute the instructions to:
determine that the producer device is not available to the router before receiving the retransmission of the interest packet; and
alert the consumer device of a location change of the producer device.

13. The router of claim 12 wherein alerting the consumer device comprises the one or more processors executing the instructions to:
send a PDU message with a mobility update flag (MU-tag) to the consumer device.

14. The router of claim 10 wherein the one or more processors execute the instructions to:
receive a registration message from a producer wherein the registration message has a MS-tag flag and, based thereon, maintaining a single PIT entry per content name per consumer device.

15. The router of claim 10 wherein the second nonce is used to identify a single incoming interface for the interest packet, over which to deliver a data packet.

16. The router of claim 10 wherein the second nonce is dynamically varied such that an identity of the consumer device is anonymous to the producer device.

17. The router of claim 10, wherein the one or more processors execute the instructions to forward the retransmitted interest packet to the producer along the first path.

18. A non-transitory computer-readable medium storing computer instructions for routing an interest packet that, when executed by one or more processors, cause the one or more processors to perform the steps of:
receive, by a router, from a consumer device an interest packet comprising a first nonce and a second nonce, wherein the second nonce of the interest packet indicates that the interest packet is associated with a first transmission of content requested by the consumer;
create a pending interest table (PIT) entry based on the interest packet, wherein the PIT entry comprises the second nonce of the interest packet;
forward the interest packet to a producer device along a first path;
after forwarding the interest packet to the producer:
receive a retransmission of the interest packet wherein the retransmitted interest packet comprises a different second nonce, wherein the second nonce of the retransmitted interest packet indicates that the retransmitted interest packet is associated with a second transmission of the content requested by the consumer, and wherein the interest packet and the retransmitted interest packet request the same content; and
clear the PIT entry based on a determination that second nonce of the retransmitted interest packet is different from the second nonce in the PIT.

19. The computer-readable medium of claim 18, wherein a single PIT entry per content name, and a single nonce within the PIT entry per consumer device are maintained.

* * * * *